US008302740B2

(12) United States Patent
Swaybill et al.

(10) Patent No.: US 8,302,740 B2
(45) Date of Patent: Nov. 6, 2012

(54) INTEGRATED SUPPORT FOR ELEVATOR MACHINE, SHEAVES AND TERMINATIONS

(75) Inventors: Bruce P. Swaybill, Farmington, CT (US); Bruce St. Pierre, Unionville, CT (US); Leandre Adifon, Farmington, CT (US); Barry Graham Blackaby, West Simsbury, CT (US)

(73) Assignee: Otis Elevator Company, Farmington, CT (US)

(*) Notice: Subject to any disclaimer, the term of this patent is extended or adjusted under 35 U.S.C. 154(b) by 1506 days.

(21) Appl. No.: 10/537,605

(22) PCT Filed: Jan. 31, 2003

(86) PCT No.: PCT/US03/02850
§ 371 (c)(1),
(2), (4) Date: Jun. 3, 2005

(87) PCT Pub. No.: WO2004/069715
PCT Pub. Date: Aug. 19, 2004

(65) Prior Publication Data

US 2006/0042882 A1 Mar. 2, 2006

(51) Int. Cl.

| | |
|---|---|
| ***B66B 7/04*** | (2006.01) |
| ***B66B 11/08*** | (2006.01) |
| ***B66B 7/00*** | (2006.01) |
| ***B66D 1/36*** | (2006.01) |
| ***F16M 1/08*** | (2006.01) |
| ***F16M 13/00*** | (2006.01) |

(52) U.S. Cl. ........ 187/411; 187/254; 187/266; 254/334; 248/674; 248/678

(58) Field of Classification Search .................. 187/251, 187/254, 266, 401, 406, 414; 254/264, 334; 248/674, 678; *B66B 11/04, 11/06, 7/00, B66B 9/00*
See application file for complete search history.

(56) References Cited

U.S. PATENT DOCUMENTS

| | | | | | |
|---|---|---|---|---|---|
| 719,852 | A | | 2/1903 | Ortner | |
| 3,519,101 | A | * | 7/1970 | Sieffert | 187/256 |
| 4,537,286 | A | * | 8/1985 | Morris et al. | 187/412 |
| 4,664,230 | A | | 5/1987 | Olsen | |
| 4,807,723 | A | * | 2/1989 | Salmon et al. | 187/266 |
| 5,000,292 | A | * | 3/1991 | Chapelain et al. | 187/408 |
| 5,076,398 | A | * | 12/1991 | Heikkinen | 187/266 |

(Continued)

FOREIGN PATENT DOCUMENTS

CN 1257821 A 6/2000

(Continued)

OTHER PUBLICATIONS

PCT International Search Report for International Application No. PCT/US03/02850, mailed Aug. 8, 2003.

(Continued)

*Primary Examiner* — Michael Mansen
*Assistant Examiner* — Stefan Kruer
(74) *Attorney, Agent, or Firm* — Carlson, Gaskey & Olds PC

(57) ABSTRACT

A single support device (30) is adapted to support and secure a machine (34) at least one sheave (38) and a plurality of termination members (44, 46). The single support device (30) is conveniently installed within a hoistway (26) or within a machine room (90). The machine (34) and sheave (38) may be premounted to the support device (30) and the entire assembly can be lowered into position by crane (300).

8 Claims, 4 Drawing Sheets

U.S. PATENT DOCUMENTS

| | | | | | |
|---|---|---|---|---|---|
| 5,361,873 | A * | 11/1994 | de Jong et al. | 187/264 |
| 5,361,874 | A | 11/1994 | Brown | |
| 6,193,017 | B1 | 2/2001 | Koster | |
| 6,230,844 | B1 | 5/2001 | Latorre | |
| 6,234,276 | B1 * | 5/2001 | Wagatsuma et al. | 187/411 |
| 6,357,556 | B1 * | 3/2002 | Pettersson et al. | 187/414 |
| 6,364,062 | B1 * | 4/2002 | Ericson et al. | 187/264 |
| 6,446,762 | B1 | 9/2002 | St. Pierre et al. | |
| 6,446,763 | B1 * | 9/2002 | Glassey et al. | 187/414 |
| 6,782,975 | B1 | 8/2004 | Whittur | |
| 7,543,685 | B2 * | 6/2009 | Ach et al. | 187/250 |
| 7,775,325 | B2 * | 8/2010 | Liebetrau et al. | 187/254 |
| 2002/0017434 | A1 * | 2/2002 | Orrman et al. | 187/254 |
| 2002/0040830 | A1 | 4/2002 | Hamaguchi | |
| 2002/0185338 | A1 * | 12/2002 | Bauer | 187/254 |
| 2004/0159501 | A1 * | 8/2004 | Bloch et al. | 187/408 |
| 2011/0101198 | A1 * | 5/2011 | Trach | 248/674 |
| 2011/0132694 | A1 * | 6/2011 | Fischer et al. | 187/254 |
| 2011/0132695 | A1 * | 6/2011 | Aziz et al. | 187/266 |
| 2011/0226557 | A1 * | 9/2011 | Ericson et al. | 187/266 |

FOREIGN PATENT DOCUMENTS

| | | | |
|---|---|---|---|
| EP | 0646537 | A1 | 4/1995 |
| EP | 1314680 | A1 | 5/2003 |
| EP | 1057771 | B1 | 4/2005 |
| FR | 2694279 | A1 | 2/1994 |
| GB | 2383791 | A * | 7/2003 |
| JP | 5076747 | | 6/1975 |
| JP | 2001048450 | | 2/2001 |
| JP | 2001220078 | | 8/2001 |
| JP | 2002003126 | A * | 1/2002 |
| JP | 2002087741 | | 3/2002 |
| WO | 0007923 | | 2/2000 |
| WO | WO 02/098782 | A1 | 12/2002 |

OTHER PUBLICATIONS

Examiner's Decision of Rejection (Translation) issued by the Japanese Patent Office on Sep. 9, 2008, for the corresponding Japanese Patent Application No. 2004-567960.

* cited by examiner

INTEGRATED SUPPORT FOR ELEVATOR MACHINE, SHEAVES AND TERMINATIONS

BACKGROUND OF THE INVENTION

1. Field of the Invention

This invention generally relates to elevator systems. More particularly, this invention relates to a support for securing a machine, a drive sheave and belt terminations within an elevator system.

2. Description of the Prior Art

Elevator systems typically include a cab and counterweight that move within a hoistway. A plurality of ropes or belts typically support the weight of the cab and the counterweight within the hoistway. An arrangement of sheaves accomplishes the desired cooperation between the cab and counterweight and a machine (i.e., motor and brake) for moving the cab to the various landings within a building, for example.

Conventionally, the machine and drive sheave have been mounted within a machine room above the top of a hoistway, for example. There recently has been a trend toward machineroomless elevator systems to minimize the expenses associated with providing an elevator system within a building. Eliminating machine rooms requires alternative arrangements for supporting the machine, drive sheave and other components of the elevator system.

Another drawback associated with conventional arrangements is that a considerable amount of time and labor is required for installing the elevator machine, sheaves and associated components. Eliminating a machine room makes this process more difficult as components that had been supported in a machine room become suspended or otherwise supported within the hoistway. Alternative installation strategies and techniques are desirable and required to minimize the expenses associated with the labor required for installing elevator system components.

This invention provides a unique support arrangement that conveniently secures a machine, sheaves and belt terminations on a single support structure.

SUMMARY OF THE INVENTION

In general terms, this invention is a single support that supports a machine, at least one sheave and a plurality of belt terminations in an elevator system.

One example support device designed according to this invention includes a machine supporting portion that is adapted for securing a machine in a selected position. A termination supporting portion is adapted to secure a plurality of termination members, which are associated with ends of elongated load bearing members in the elevator system. A sheave supporting portion is adapted to support at least one sheave that is driven by the machine. The supporting portions are secured together to form a single structure that supports the machine, the sheave and the termination members.

With the inventive support device, installing an elevator system is greatly simplified. One advantage of this invention is that it allows a method of installation including premounting the machine on the support device. The entire support device, with the already-mounted machine, can be lifted by a crane, for example, and lowered into position at the top of a hoistway. With the inventive arrangement, the machine is already aligned and positioned appropriately on the support device so that the operator time involved during machine installation on-site is reduced and the task is simplified.

In one example, the machine supporting portion and the sheave supporting portion comprise two lateral beam members. In one example, the lateral beam members are spaced apart from each other and the termination supporting portion comprises at least one transverse member that extends between and is secured to the lateral beam members.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
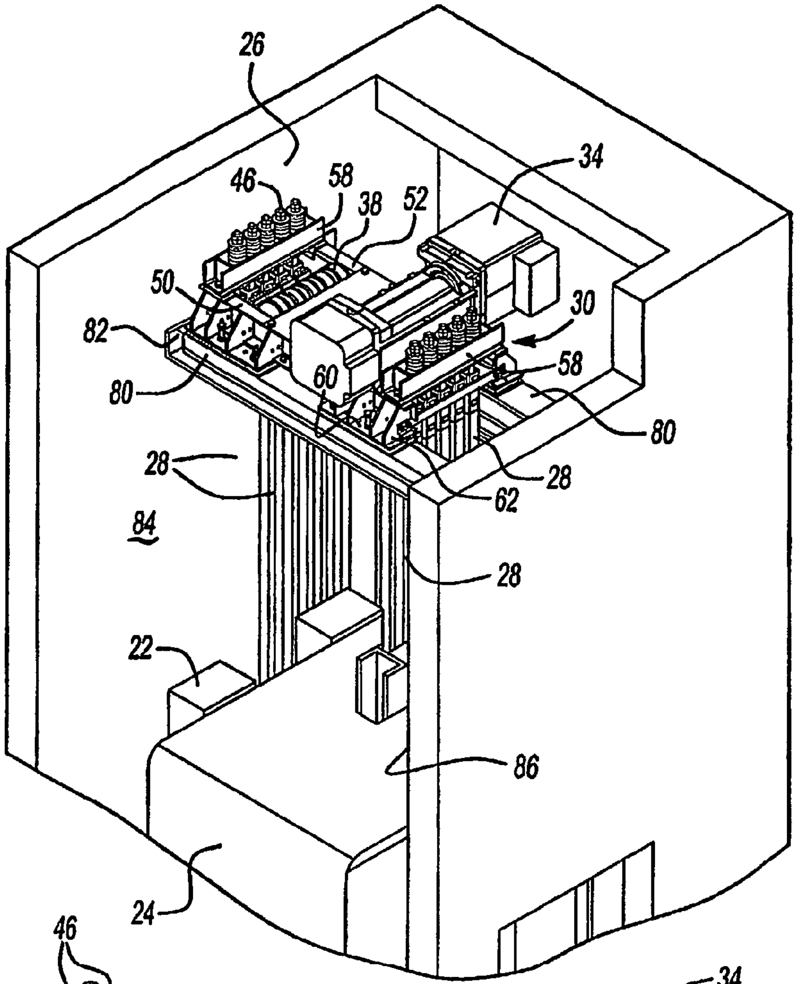
FIG. 1 diagrammatically illustrates selected portions of an elevator system including a support device designed according to this invention.

FIG. 1 schematically illustrates an elevator system 20 where a counterweight 22 and elevator cab 24 move within a hoistway 26 in a generally conventional manner. A plurality of elongated load bearing members, such as belts 28, support the weight of the counterweight 22 and cab 24 within the hoistway as they are suspended and move into the various positions so that the elevator cab 24 is positioned as needed.

A support device 30 securely positions various components of the elevator system in place in a convenient manner. A significant advantage of this invention is that it integrates the supporting and securing functions associated with several elevator system components into a single support device. The inventive device can be conveniently assembled and positioned as desired within a hoistway or building to establish the necessary arrangement to provide cooperation between various elevator components in a cost-effective and time-saving manner.

Figure 2:
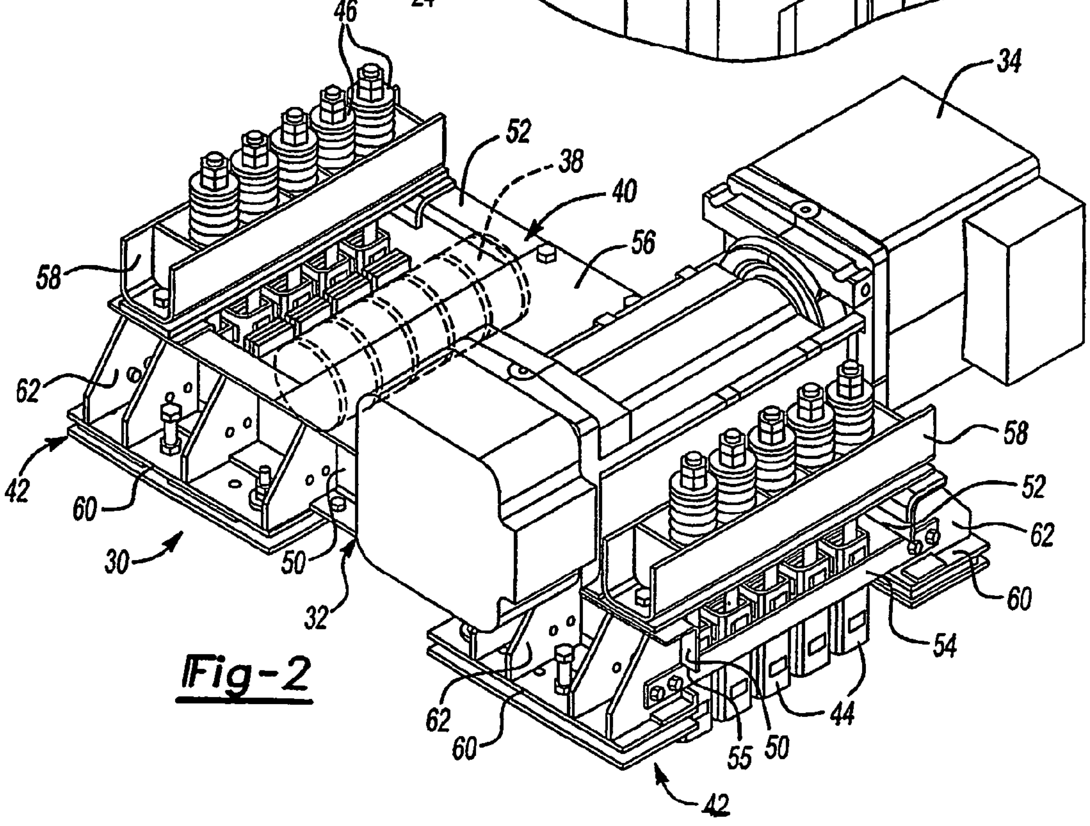
FIG. 2 diagrammatically illustrates, in perspective view, an example embodiment of a support device designed according to this invention.

As shown in FIG. 2 for example, the support device 30 has a machine supporting portion 32 that is adapted for securing a machine 34 (i.e., motor, drive sheave and brake) in a desired position. In the illustrated example, idler sheaves 38 (in phantom) are supported on the sheave supporting portion 40 of the device 30. More than one sheave typically will be supported on the sheave supporting portion 40. Inventive arrangements made possible with the inventive support device are discussed below.

Termination supporting portions 42 are positioned near the longitudinal ends of the example embodiment. A plurality of termination members 44 with adjustment spring assemblies 46 are supported by the termination supporting portions 42. In one example, the termination members 44 operate in a conventional manner to secure the ends of the belts 28 in a known manner.

Figure 3:
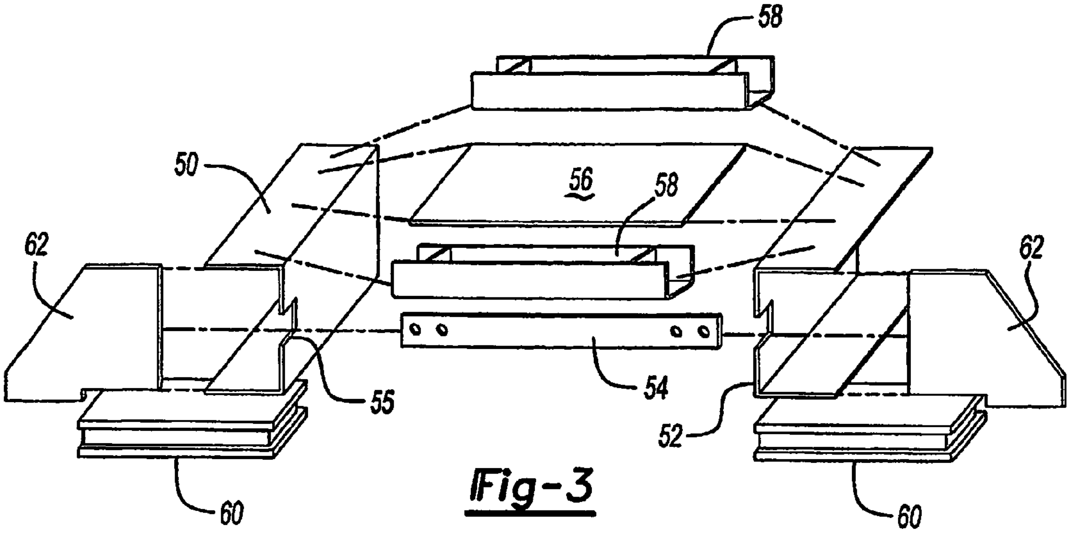
FIG. 3 schematically illustrates selected portions of the embodiment of FIG. 2 in exploded, perspective view.

As best appreciated from FIGS. 2 and 3, this embodiment of the support device 30 includes several components that are secured together to establish a single support device that secures components such as the machine 34, sheaves 38 and the termination members 44 and 46 in desired positions and supports at least some of the load associated with those components and elevator system components that are associated with those components.

In one example, the various pieces of the support device 30 are made from metal sheets. Fasteners such as bolts in the illustrated arrangement are used to secure the pieces together to establish a cohesive, single support device 30. Some portions of the support device may be welded together or otherwise secured together to meet the needs of a particular situation.

Two lateral beam members 50 and 52 extend parallel to each other and have a generally C-shaped cross section. At least one cross brace member 54 extends between the beam members 50 and 52 near the longitudinal ends of the beams. In the illustrated example, each beam includes a slot 55 through which at least a portion of the cross member 54 is received. A transverse plate 56 is secured to top (according to the illustrations) portions of the beams 50 and 52 near the longitudinal center or central portion of the beams. Termination supporting brace members 58 extend between the beam members 50 and 52 near the longitudinal ends of the beam members. As can be appreciated by those skilled in the art, the transverse termination supporting brace members 58 at least partially bear the loads associated with the termination members and the belts or other elongated load bearing members in the elevator system. The termination supporting brace members 58 in the illustrated example are bolted to the top (according to the drawings) portions of the beams 50 and 52, respectively.

Near each end of the beam members 50 and 52, mounting members 60 are secured to the underside (according to the illustrations) of the beams. The mounting members 60 facilitate securing the support device 30 in a desired position relative to an elevator hoistway. Various configurations are possible as will be discussed below.

A plurality of vertically extending support braces 62 are associated with each end of the beam members 50 and 52. The brace members 62 provide connection points for the transverse beams 54 so that a secured connection between the beams 50, 52 and 54 are established. The brace members 62 are secured within the C-shaped channels of the beam members 50 and 52 and preferably are secured to a corresponding portion of the appropriate mounting member 60. In one example, the mounting members 60 comprise a plurality of metal plates as shown in the illustrations.

In one example, punched sheet metal is used for the various portions of the support device 30. A 4 mm sheet thickness is used to satisfy the load bearing requirements of many elevator systems. Those skilled in the art who have the benefit of this description will be able to select appropriate materials, configurations and thicknesses to meet the needs of their particular situation. Example support devices designed according to this invention can be scaled to meet any duty and speed requirements using 1.5 ton, 2.5 ton or 5 ton machines, for example.

The compact arrangement of the inventive device increases hoistway efficiency by utilizing less space and requiring less complex mounting arrangements. For example, the height of the entire assembly is no greater than that of the machine 34 in some embodiments. This not only enhances the economies of the elevator system but also reduces building construction cost for accommodating an elevator system.

FIG. 1 illustrates one example arrangement where the support device 30 is supported on beams 80 that are secured to the hoistway walls using mounting members 82. The beams 80 and mounting members 82 may take a variety of configurations depending on the particular building and the requirements for a particular installation. In the illustrated arrangement, the mounting members 82 are secured to rear 84 and front 86 walls of the hoistway 26.

One advantage of the inventive support device is that it can be used with a variety of elevator system configurations by rotating the device relative to the hoistway or shifting the position of the components that are supported on the support device 30. The inventive device is readily useable with side-to-side counterweight and cab configurations or front-to-back counterweight and cab configurations. The illustrated arrangement has the counterweight "behind" the elevator cab 24.

Figure 4:
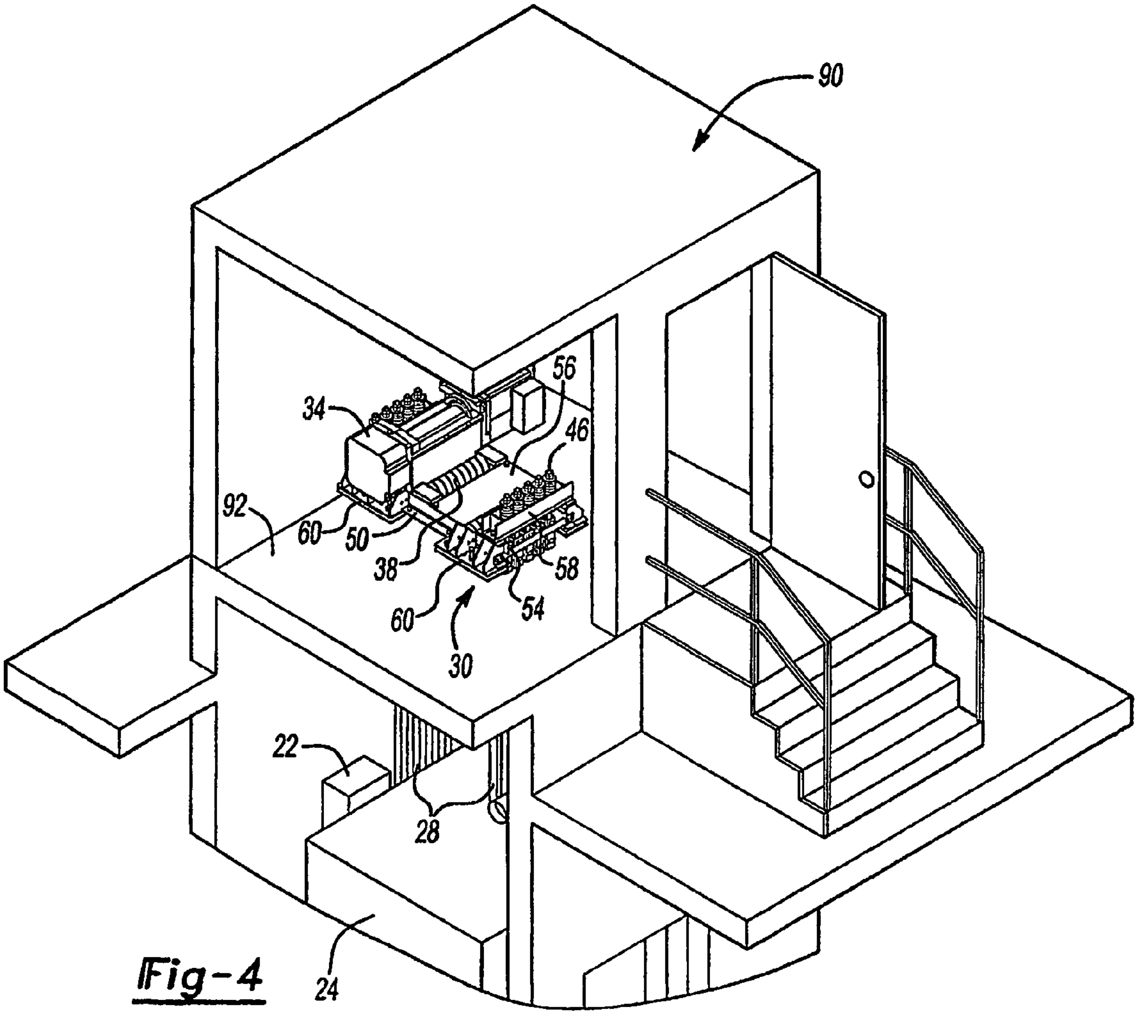
FIG. 4 diagrammatically illustrates selected portions of another elevator system incorporating a support device designed according to this invention.

FIG. 4 illustrates another application for a support device 30 designed according to this invention. In this example, a machine room 90 is provided at the top of a hoistway. A base slab 92 provides the surface to which the support members 60 are secured for holding the support device 30 in place at the top of the hoistway.

The example embodiments of FIGS. 1 through 4 are particularly well suited for a 2:1 roping arrangement where a compact machine arrangement is desired.

Figure 5:
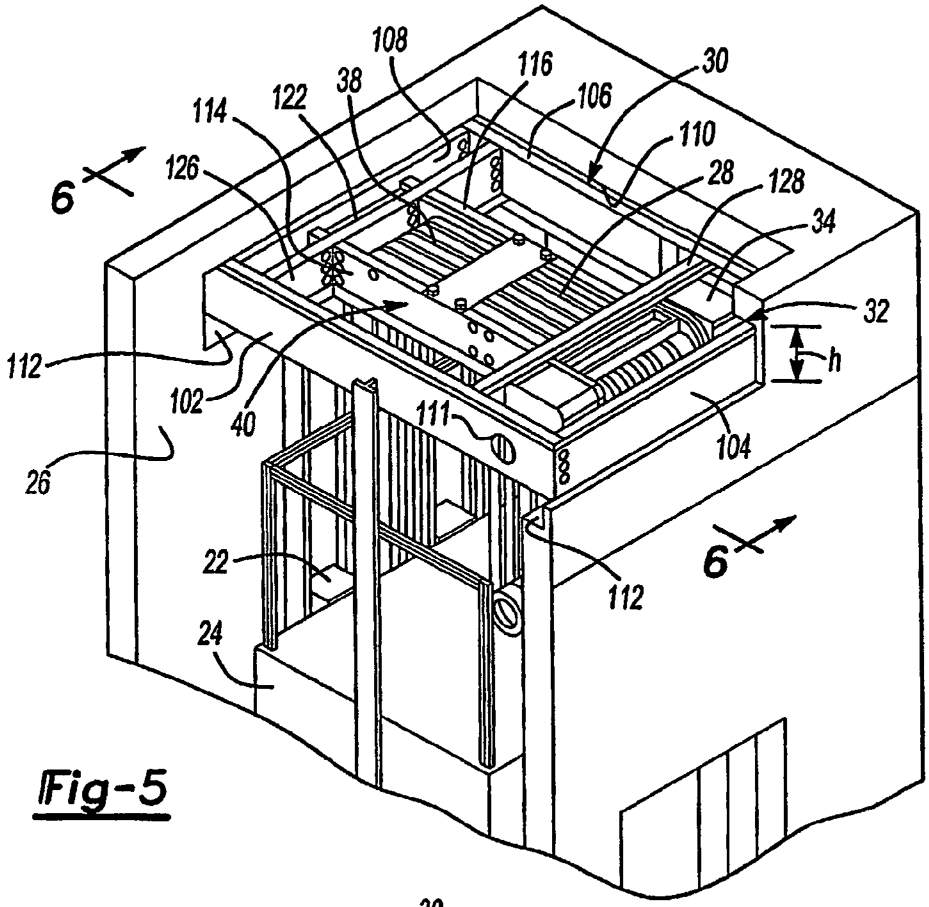
FIG. 5 diagrammatically illustrates another example embodiment of a support device designed according to this invention.

FIG. 5 shows another example embodiment designed according to this invention. In this example, the support device 30 comprises a cassette that establishes an envelope within which the machine 34, sheaves 38 and termination support portions fit. In this example, outside beams 102, 104, 106 and 108 establish an outer envelope of the support device 30. In this example, the beams 102-108 comprise generally C-shaped steel members that are secured together. The overall height of the support device 30 and the assembly is no greater than that of the machine 34. This allows for the installation of the support device 30 near the top 110 of the hoistway 26. The beam 102 in this example includes an opening 111 that allows access to the encoder (not illustrated) of the premounted machine 34.

In the illustrated example, at least two of the walls of the hoistway 26 include support recesses 112 into which appropriate portions of the support device 30 are received so that the weight is supported by the walls of the building hoistway. In this example, the beams 108 and 104 are received in the recesses 112.

Figure 6:
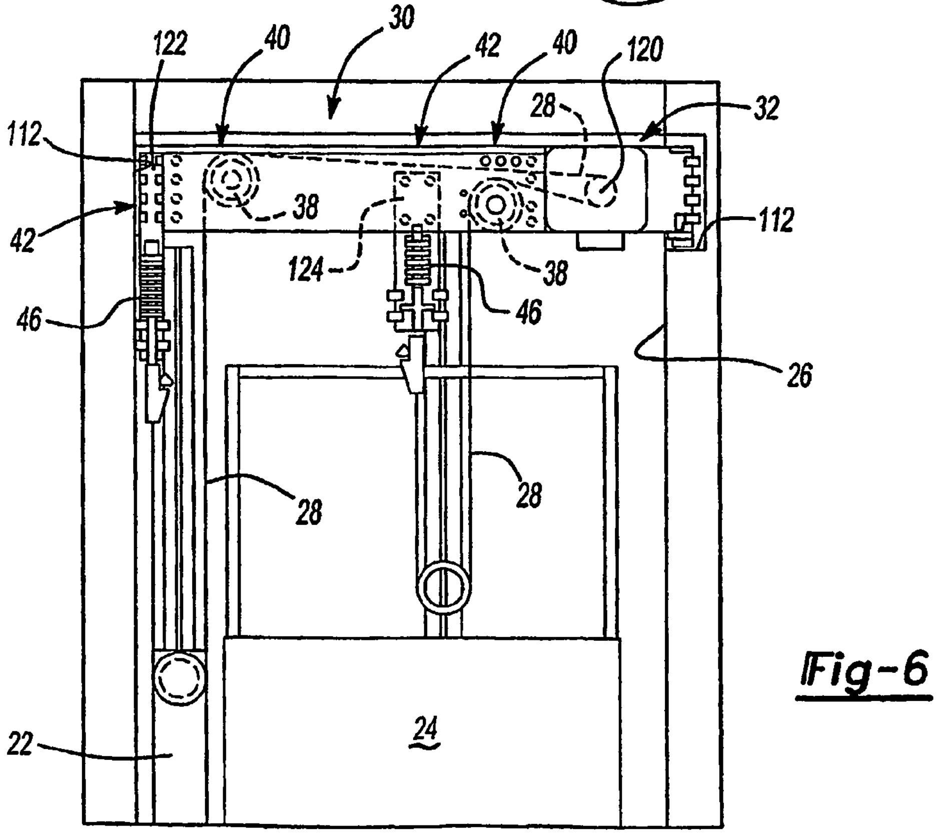
FIG. 6 illustrates selected features of the embodiment of FIG. 5.

Two lateral beam members 114 and 116 support the axes of the sheaves 38 so that they are parallel with the drive sheave 120 of the machine 34 (FIG. 6). The lateral beams 114 and 116 also support the weight of termination supporting portions 122 and 124. A set of transverse beam members 126 and 128 extend perpendicular to the lateral beams 114 and 116 to provide additional support. In this example, the lateral beams 114 and 116 and the transverse beams 126 and 128 all comprise generally C-shaped steel beam members.

Referring for example to FIG. 6, the inventive arrangement allows for strategic placement of the sheaves 38 relative to the other elevator system components to achieve system efficiencies. In the example of FIG. 6, the support belts 28 are wrapped about the drive sheave 120 with at least a 180° wrap about the sheave. This provides significant advantages because there is more surface contact between the belts and the drive sheave 120. The placement of the idler sheaves 38 effectively provides for horizontal deflection of the support belts 28 from their vertical position where they extend down toward the cab or counterweight. In this example, all sheaves rotate about parallel axes. The inventive arrangement allows for conveniently establishing such relative sheave positions to achieve better belt performance and facilitates much easier installations of such components.

The same sheave alignment and belt wrapping technique is useful with the embodiments of FIGS. 1-4 and 7.

Figure 7:
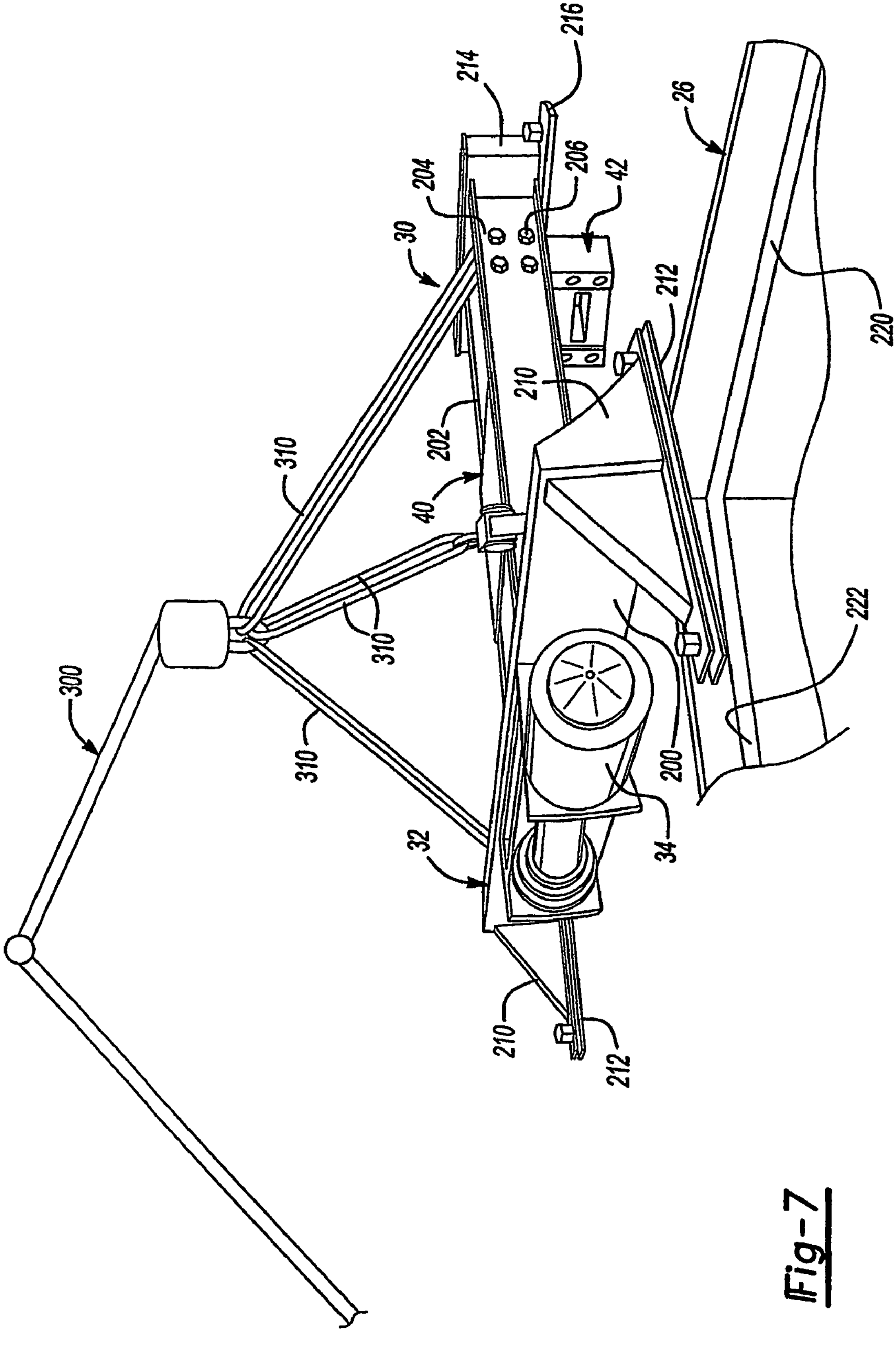
FIG. 7 illustrates another example embodiment of a support device designed according to this invention and schematically illustrates an inventive method of installing elevator system components.

FIG. 7 illustrates another example embodiment of a support device 30 designed according to this invention. In this example, the machine 34 is supported on the machine support portion 32, which comprises a generally C-shaped elongated steel beam 200. In this example, each end of the beam 200 includes support braces 210 and mounting places 212.

The sheave supporting portion 40 comprises beams 202 and 204 that extend perpendicularly from the beam 200. An opposite end of the beams 202 and 204 is associated with a mounting beam member 214 and a mounting plate 216. The mounting plates 212 and 216 are received onto support surfaces 220 and 222 at the top of the hoistway 26. The device 30 can be secured in position using connectors appropriate for the particular building construction or hoistway arrangement.

Only one belt termination support 42 is visible in the illustration of FIG. 7. In this example, bolts 206 secure the termination support portion 42 to the beams 202 and 204.

The inventive support device provides faster, safer and more efficient installation of the components that are secured and supported by the support device 30. The support device 30 is received into the top of the hoistway 26 in a convenient manner as schematically shown. For example, FIG. 7 shows an assembly where the machine 34 is securely mounted onto the support device 30 before arrival at the installation site and the entire arrangement is lifted by a crane 300 to the desired position relative to the elevator hoistway during installation. Pre-assembly at a factory allows for saving time and labor in the field during installation and reduces safety concerns. The machine 34 can be properly positioned on the support device 30 so that no further location adjustment is required once the device 30 is lowered into position.

By strategically using support straps 310 and the crane 300, the entire support device arrangement with at least the machine 34 preassembled and premounted onto the support device can be conveniently lowered into position at the top of a hoistway. The sheaves and termination devices also may be premounted on the support device 30 prior to arrival at the installation site.

Another advantageous use of the inventive support device is that it allows for economically facilitating so-called "jump" elevator installation procedures. The inventive support device 30 can be positioned at any height with a hoistway using support beams like the beams 80 and then eventually moved to the permanent location where the support device will be used to facilitate the completed elevator system operation. The crane 300 can be used for each relocation of the support device 30 for each "jump."

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A support device for a machine-roomless elevator system, comprising:

a machine supporting portion that secures a machine comprising a motor in a selected position in a hoistway;

a termination supporting portion that secures a plurality of termination members in a selected position, the termination members being configured to secure an end of associated load bearing members near the selected position; and a sheave supporting portion that supports at least one sheave, the supporting portions being secured together to form a single structure that supports the machine, the termination members and the sheave, the single structure being located inside the hoistway, the supporting portions each comprise a plurality of metal sheets secured together.

2. The device of claim 1, including two spaced lateral beam members, at least one transverse beam member extending between and secured to the lateral beam members near each end of the beam members, and a mounting member near each end of each of the lateral beam members, the mounting members adapted to secure the device to a structure that carries a load of the device and associated elevator system components.

3. The device of claim 2, including a plurality of vertical brace members secured to each of the mounting members and corresponding portions of the lateral beam members.

4. The device of claim 1, including a second termination supporting portion that secures a second plurality of termination members in a selected position and wherein one of the pluralities of termination members are associated with an elevator cab and the other plurality of termination members are associated with a counterweight.

5. The device of claim 1, including a second sheave supporting portion that supports a second sheave.

6. The device of claim 1, wherein the machine supporting portion and the sheave supporting portion comprise two lateral beam members.

7. A support device for a machine-roomless elevator system, comprising:

a machine supporting portion that secures a machine comprising a motor in a selected position in a hoistway;

a termination supporting portion that secures a plurality of termination members in a selected position; and a sheave supporting portion that supports at least one sheave, the supporting portions being secured together to form a single structure that supports the machine, the termination members and the sheave, the single structure being located inside the hoistway, the machine supporting portion and the sheave supporting portion comprise two lateral beam members spaced from each other and the termination supporting portion comprises at least one transverse member extending between and secured to the lateral beam members, the machine resting directly on the two lateral beam members with a sheave portion of the machine being rotatable about an axis that is perpendicular to the two lateral beam members, the sheave portion of the machine being vertically aligned with a space between the two lateral beam members, the at least one sheave being rotatable about an axis that is perpendicular to the two lateral beam members, the at least one sheave being vertically aligned with the space between the two lateral beam members.

8. A support device for an elevator system, comprising:

a machine supporting portion that secures a machine comprising a motor and a drive sheave in a selected position;

a termination supporting portion that secures a plurality of termination members in a selected position; and a sheave supporting portion that supports at least one sheave, the supporting portions each comprising a plurality of metal sheets secured together, the supporting portions being secured together to form a single structure that supports the machine, the termination members and the sheave.

* * * * *